US009473314B2

(12) United States Patent
Jacobus

(10) Patent No.: US 9,473,314 B2
(45) Date of Patent: Oct. 18, 2016

(54) DISTRIBUTED COMPUTING ENVIRONMENT

(71) Applicant: Cybernet Systems Corporation, Ann Arbor, MI (US)

(72) Inventor: Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 326 days.

(21) Appl. No.: 13/915,223

(22) Filed: Jun. 11, 2013

(65) Prior Publication Data
US 2014/0003321 A1     Jan. 2, 2014

Related U.S. Application Data

(63) Continuation of application No. 09/785,385, filed on Feb. 16, 2001, now Pat. No. 8,463,839.

(60) Provisional application No. 60/192,977, filed on Mar. 28, 2000.

(51) Int. Cl.
| H04L 12/18 | (2006.01) |
| H04L 29/06 | (2006.01) |
| H04L 12/701 | (2013.01) |
| H04L 29/08 | (2006.01) |

(52) U.S. Cl.
CPC ........... *H04L 12/18* (2013.01); *H04L 12/1818* (2013.01); *H04L 29/06* (2013.01);
(Continued)

(58) Field of Classification Search
CPC ....... H04L 12/28; H04L 12/26; H04L 12/00; H04L 12/185; H04L 29/02; H04L 29/06; H04L 45/00; H04L 67/327; H04N 21/20
USPC ......... 370/390, 353, 312; 709/230, 204, 238
See application file for complete search history.

(56) References Cited

U.S. PATENT DOCUMENTS

| 5,292,125 A | 3/1994 | Hochstein et al. |
| 5,350,176 A | 9/1994 | Hochstein et al. |

(Continued)

OTHER PUBLICATIONS

Erramilli, A. et al., A Reliable and Efficient Multicast Protocol for Broadband Broadcast Networks, *Applications, Technologies, Architectures, and Protocols for Computer Communication*, ACM Press, Aug. 1987, pp. 343-352.

(Continued)

*Primary Examiner* — Anh Ngoc Nquyen
*Assistant Examiner* — Syed M Bokhari
(74) *Attorney, Agent, or Firm* — Dinsmore & Shohl LLP

(57) ABSTRACT

A very large number of applications communicate logically through a many-to-many multicast cloud on the common carrier Internet. Three types of systems operate together to implement the method. The first is a network enabled client application, such as a distributed simulation or game, which joins an application cloud or federation and communicates its internal state changes into the cloud via a communication applications programming interface. The second is a lobby manager or broker which accepts entry into a communication cloud or federation and provides information to the federation and the client application for establishing communications between them. And third, is an application-specific routing system which provides the normal function of routing packets between Internet hosts (client applications running on these hosts), but also allows the routing functions to affected by modules in the router which are associated with the distributed application or simulation being implemented.

13 Claims, 8 Drawing Sheets

(52) U.S. Cl.
CPC .......... *H04L 45/00* (2013.01); *H04L 12/185* (2013.01); *H04L 67/327* (2013.01); *H04L 67/38* (2013.01); *H04L 69/329* (2013.01)

(56) References Cited

U.S. PATENT DOCUMENTS

| | | |
|---|---|---|
| 5,538,255 A | 7/1996 | Barker |
| 5,558,339 A | 9/1996 | Perlman |
| 5,644,571 A | 7/1997 | Seaman |
| 5,659,691 A | 8/1997 | Durward et al. |
| 5,664,778 A | 9/1997 | Kikuchi et al. |
| 5,666,360 A | 9/1997 | Chen et al. |
| 5,668,950 A | 9/1997 | Kikuchi et al. |
| 5,685,775 A | 11/1997 | Bakoglu et al. |
| 5,734,651 A | 3/1998 | Blakeley et al. |
| 5,736,990 A | 4/1998 | Barrus et al. |
| 5,740,231 A | 4/1998 | Cohn et al. |
| 5,762,552 A | 6/1998 | Vuong et al. |
| 5,775,996 A | 7/1998 | Othmer et al. |
| 5,820,463 A | 10/1998 | O'Callaghan |
| 5,828,866 A | 10/1998 | Hao et al. |
| 5,841,980 A | 11/1998 | Waters et al. |
| 5,896,444 A | 4/1999 | Perlman et al. |
| 5,899,810 A | 5/1999 | Smith |
| 5,920,862 A | 7/1999 | Waters |
| 5,956,485 A | 9/1999 | Perlman |
| 5,984,786 A | 11/1999 | Ehrman |
| 6,006,254 A | 12/1999 | Waters et al. |
| 6,015,348 A | 1/2000 | Lambright et al. |
| 6,050,098 A | 4/2000 | Meyer et al. |
| 6,055,364 A | 4/2000 | Speakman et al. |
| 6,064,677 A | 5/2000 | Kappler et al. |
| 6,067,569 A | 5/2000 | Khaki et al. |
| 6,091,724 A | 7/2000 | Chandra et al. |
| 6,091,953 A | 7/2000 | Ho et al. |
| 6,138,144 A | 10/2000 | DeSimone et al. |
| 6,185,602 B1 | 2/2001 | Bayrakeri |
| 6,216,173 B1 | 4/2001 | Jones et al. |
| 6,315,668 B1 | 11/2001 | Metke et al. |
| 6,343,313 B1 | 1/2002 | Salesky et al. |
| 6,463,078 B1 | 10/2002 | Engstrom et al. |
| 6,579,184 B1 | 6/2003 | Tanskanen |
| 6,611,872 B1* | 8/2003 | McCanne ............... 709/238 |
| 6,763,371 B1* | 7/2004 | Jandel ............... G06F 9/542 370/260 |
| 7,231,433 B1 | 6/2007 | Hellbusch et al. |
| 2003/0214943 A1* | 11/2003 | Engstrom et al. ......... 370/353 |
| 2005/0100016 A1* | 5/2005 | Miller et al. ............. 370/390 |
| 2006/0248208 A1* | 11/2006 | Walbeck et al. ........... 709/230 |

OTHER PUBLICATIONS

Macedonia, M. et al., NPSNET: A Multi-Player 3D Virtual Environment Over the Internet, Symposium on Interactive 3D Graphics, ACM Press, Apr. 1995.

Jia, X, A Distributed Algorithm of Delay-Bounded Multicast Routing for Multimedia Applications in Wide Area Networks, *Transactions on Networking, ACM Press*, Dec. 1998, pp. 828-837.

Saar, K., VIRTUS: A Collaborative Multi-User Platform, Virtual Reality Modeling Language Symposium, ACM Press, Feb. 1999, pp. 141-152.

Holbrook, H. et al., IP Multicast Channels: Express Support for Large-scale Single-source Applications, *Applications, Technologies, Architectures, and Protocols for Computer Communication, ACM Press*, Aug. 1999, pp. 65-78.

Schulzrinne, H., RTP Profile for Audio and Video Conferences with Minimal Control, pp. 1-28, Jan. 1996.

(Author unknown) IEEE Standard for Distributed Interactive Simulation—Communication Services and Profiles, pp. i-13, Apr. 1996.

Pullen, J. et al., Dual-Mode Multicast for DIS.

Schulzrinne, H., et al., RTP: A Transport Protocol for Real-Time Applications, pp. 1-55, Jan. 1996.

U.S. Department of Defense, "High-Level Architecture Rules Version 1.3," Feb. 1998.

Armitage, G., Support for Multicast over UNI 3.0/3.1 based ATM Networks, pp. 1-54, Nov. 1996.

Armitage, G., Venus—Very Extensive Non-Unicast Service, pp. 1-8. Sep. 1997.

Fenner, W., Internet Group Management Protocol, Version 2, pp. 1-16, Nov. 1997.

Handley, M. et al., SDP: Session Description Protocol, pp. 1-28, Apr. 1998.

Talpade, R. et al. Multicast Server Architectures for MARS-based ATM Multicasting, pp. 1-12, May 1997.

Schulzrinne, H., et al., Real Time Streaming Protocol (RTSP), pp. 1-92, Apr. 1998.

Pullen, M., et al., Limitations of Internet Protocol Suite for Distributed Simulation in the Large Multicast Environment, pp. 1-8, Feb. 1999.

Arango, M. et al., Media Gateway Control Protocol (MGCP) Version 1.0, pp. 1-88, Oct. 1999.

Pullen, M. et al., A Simulation Model for IP Multicast with RSVP, pp. 1-21, Jan. 1999.

Deering, S., Host Extensions for IP Multicasting, pp. 1-12, Aug. 1989.

Alluisi, E., The Development of Technology for Collective Training: SIMNET, a Case History, pp. 343-362, Jun. 1991.

Mills, D., Network Time Protocol (Version 3) Specification, Implementation and Analysis, Mar. 1992.

DIS Steering Committee, "The DIS Vision: A Map to the Future of Distributed Simulation," pp. i-47, May 1994.

Calvin, J. et al., Stow Realtime Information Transfer and Networking System Architecture.

Cosby, N., SIMNET: An Insider's Perspective, pp. 1-19, Mar. 1995.

"IEEE Standard for Distributed Interactive Simulation—Application Protocols," pp. 1-130, Mar. 1996.

* cited by examiner

DISTRIBUTED COMPUTING ENVIRONMENT

REFERENCE TO PRIOR APPLICATION

This application is a continuation of U.S. patent application Ser. No. 09/785,385, filed Feb. 16, 2001, which claims priority of U.S. provisional application Ser. No. 60/192,977, filed Mar. 28, 2000, the entire content of both of which are incorporated herein by reference.

FIELD OF THE INVENTION

This invention relates generally to network computing and, more particularly, to a distributed environment that supports massive groupware streaming and pier-to-pier packetized communications.

BACKGROUND OF THE INVENTION

Computer games and simulations, like most computer applications, have traditionally been limited to single play units (i.e. a single console which creates the display and is operated through one or several control devices or pads). The PC, because it can be networked via modems, on local network, or the internet, has opened up the possibility of games in which multiple player interact with each other.

Earlier work in this area describes one player connected to a single other player with simple modems. U.S. Pat. Nos. 5,292,125 and 5,350,176 to Hochstein and U.S. Pat. No. 5,538,255 to Barker describe computer game systems which can allow synchronized play between two players connect by a modem.

Later work, like U.S. Pat. Nos. 5,558,339, 5,896,444, and 5,956,485 to Perlman, describe small scale "client-server" models where a client came connects to a game server through a network. Because of game play models of this type being limited in the number of players which must be supported, most current PC games of this type allow a small number of players to interact, perhaps 10-30 players on a local area computer network. For small scale client-server games, the server can be simple and need not be optimized for the number of communication connections nor for quick/efficient access to game/client specific parameters.

Several newly release games, like Ultima Online and Everquest have expanded network player counts to the 1000-10,000 level. To achieve this level of multiple player interaction, these games use specialized central servers (or server clusters which are closely linked) which run programs that understand about all the players and how they interact with each other, thus, the individual player game systems are not complete without the central servers or server clusters. This technology has been described in the patent literature by U.S. Pat. No. 5,659,691 to Durward; U.S. Pat. No. 5,664,778 to Kikuchi and U.S. Pat. No. 5,668,950. U.S. Pat. No. 5,828,866 Hao et al. use the same concepts to distribute data in distributed CAD applications.

For the last several years, an alternative model for massive distributed play has been developed by elements of the U.S. Department of Defense and its contractors. This model is call "distributed simulation" because in its pure implementation, each client broadcasts its internal state changes (for instance object motions) to the network and reads all state changes from other clients to depict simulation changes which are computed on other client systems. Thus, no central server is needed to make the distributed system operate. The significant advantage of the distributed approach is that there is not a bottleneck at a central server (or server cluster), because each client can send data to another without going directly through a server.

The basics of this method of connecting applications into a network were refined from about 1985 to 1990 in a program generally name SIMNET. SIMNET technology was later renamed as DIS or Distributed Interactive Simulation. Some same publications from that period include Kraemer et al. (1987), Alluisi (1991), the DIS Steering Committee (1994), Calvin et al. (1995), Cosby (1995), Pullen et al. (1995) and later formal specifications documents from the IEEE (1278.1 and 1278.2 published in 1993 and 1995). Current Defense Department standards pertaining to distributed simulation, called the High Level Architecture or HLA, are published by the Defense Modeling and Simulation Office (1996).

In reality, some centralized functions still remain like finding all the players currently operating in the same distributed simulation space (so that the client can send and receive from them, the client needs to know their Internet or IP address). U.S. Pat. No. 5,685,775 to Bakoglu describes implementation of system like SIMNET but for operation via standard dial-up phone networking (SIMNET, DIS, and HLA have always assumed Internet LAN/WAN network architectures for higher state exchange rates). U.S. Pat. No. 5,775,996 to Othmer and U.S. Pat. No. 5,956,485 to Perlman describe brokering mechanisms which were similar to those integral to SINET systems as early as 1989. U.S. Pat. No. 5,899,810 to Smith and U.S. Pat. No. 6,006,254 to Waters et al. are examples of commercially targeted systems which were influenced by the DIS and HLA architecture.

Similarly, it may be advantageous to access certain centralized databases and files (like common descriptions of play area virtual terrain). These centralized functions, however, are characterized as being needed when a new client joins the simulations and when it leaves it. Thus, the more limited server is usually called a simulation broker, and can actually be implemented as part of the first client which initiates new simulated space. Centralized database distributions are described in U.S. Pat. No. 5,659,691 to Durward; U.S. Pat. No. 5,984,786 to Ehrrman; and U.S. Pat. No. 6,006,254 to Waters et al., but none of these focus only on data needed only for joining, and rather, in the spirit of client-server multiplay, provide databases from centralized points which interact intimately with on-going game playing.

For simulations like those performed in military training, over relatively high-speed networks, this advantage can be realized. However, if the simulation client is operating through a lower performance link like a dial-up modem, replicating packets to all other clients in a large pool (potentially including 1000+ clients) is not practical (i.e. the speed of transmission over the slow link precludes sending to many clients at once). This problem at the client communication end has motivate most of the client-server type solutions referenced (Hochstein U.S. Pat. No. 5,292,125 and U.S. Pat. No. 5,350,176, Barker U.S. Pat. No. 5,538,255—only two players at a time; Perlman U.S. Pat. Nos. 5,558,339, 5,896,444, 5,956,485, Durward et al. U.S. Pat. No. 5,659,691, Kikuchi et al. U.S. Pat. Nos. 5,664,778, 5,668,950, Bakoglu et al. U.S. Pat. No. 5,685,775, Barrus U.S. Pat. No. 5,736,990—small numbers of players over bandwidth limited networks; Smith U.S. Pat. No. 5,899,810, Ehrman U.S. Pat. No. 5,984,786, Water et al. U.S. Pat. No. 6,006, 254, Vange et al. U.S. Pat. No. 6,050,098, Kappler U.S. Pat. No. 6,064,677—combination of distributed, client-server, and message priority queuing to improve performance in the network and on the central server). Work to overcome aspects of the problems which arise because of poor server or network performance are described by Barrus et. al. U.S. Pat. No. 5,736,990, Othmer et al. U.S. Pat. No. 5,775,996, O'Callaghan U.S. Pat. No. 5,820,463, Waters U.S. Pat. No. 5,920,862, Lambright et al. U.S. Pat. No. 6,015,348, Vange et al. U.S. Pat. No. 6,050,098, and Kappler U.S. Pat. No. 6,064,677.

One solution to this problem is inserting a repeater router, which reads packets from each client and resends them to all relevant other clients which need to see the particular state change. In a simple form this has already been defined for the Internet using a concept called multicast. In multicast, a source client and all of its destination peers establish a multicast connection so that when the client sends its packet once into the Internet, properly featured Internet routers (which are really in this case servers with repeater routers) replicate that packet and route it to all destination clients without the source client sending the data out multiple times.

Some replication methods used in multicast have described by Chen et al. U.S. Pat. No. 5,666,360 and in numerous Internet published Request For Comment (RFC—these publicly distributed papers describe all interoperability standards used to implement the modem Internet and its protocols for data exchange; RFC are solicited and published by the Internet Society). Some RFC and papers defining details of Internet Protocol (IP) based multicasting are defined in Deering, RFC 1112, Pullen et al. (1995), Armitage RFC 2022 and RFC 2191, Fenner RFC 1112, Talpade et al. RFC 2149, and Pullen et al. RFC 2502 and RFC 2490.

Multicast, as built into some Internet routers and backbones, is conceptually very simple. One packet from a source goes in and multiple packets to multiple clients go out (more or less by copying or replicating the input packet). The service as currently designed has been built for replication data from one point in to many out to deliver media like digital video or digital audio (the digital Internet equivalent to broadcast TV or radio). For this type of use, there is no way to reduce replication effort through knowledge of the data being sent—if a client is "tuned" to a digital TV station, it needs copies of the packets being sent from that station (or packet source).

Some of the RFC disclosed applications specific streaming protocols for audio, video, and other data are defined in Schulzrinne, "RTP Profile for Audio and Video Conferences with Minimal Control," RFC 1890; Schulzrinne et al., "RTP: A Transport Protocol for Real-Time Applications," RFC 1889 and Real Time Streaming Protocol (RTSP), "RFC 2326; Defense Modeling and Simulation Office, High Level Architecture Riles Version 1.0; Handley et al., "SDP: Session Description Protocol," RFC 2327, and Arango et al., "Media Gateway Control Protocol (MGCP) Version 1.0," RFC 2706.

In Pullen et al., "A Simulation Model for IP Multicast with RSVP," RFC 2490, the authors point out a number of deficiencies in using current IP multicast to service distributed simulation. These center around the difficulty in allowing a specific simulation client into and out of multicast groups (i.e. groups which will need the clients state broadcast packets) quickly (presumably due to some application culling rule changes as a client simulation executes). This presumes that making and breaking multicast group membership is the best way to optimize packet flows.

However, rather than making multicast more efficient (which is certainly a good idea, especially for applications independent uses) in distributed simulation and gaming, an alternative of making the routing system more intelligent about what and where data is needed can also have a significant impact on overall group or federation performance. Consider that quite a bit of knowledge is available about the source and destination clients and the objects being simulated or displayed on these clients. For instance, if the object on a client station which represent client avatar (or player self) in the game is in one place, it will not be able to see another object being simulated by another client if that object is (1) behind a wall, (2) too far away, (3) moving too quickly, (4) obscured by smoke or weather, to name a few simple culling rules.

Similarly, since each object is a depiction of something with acceleration and mass properties, it cannot change is location, velocity, or acceleration outside of some operating envelope. This means that each client can track objects and predict within some error bound where they will be at each point in the future. If the predicted value is close enough to the value from the client where the object is being created (and probably controlled by a player), its state changes need not be sent to other clients which can used the predicted location. Updates are only required when predictions are different from actual location by a large enough amount to effect the quality of play.

Culling rules based on proximity in the network [Seaman U.S. Pat. No. 5,644,571], proximity in virtual space [Barrus et al. U.S. Pat. No. 5,736,990], [Waters et al. U.S. Pat. No. 5,841,980], [Waters U.S. Pat. No. 5,920,862], and [Lambright et al. U.S. Pat. No. 6,015,348], and priority [Vange et al. U.S. Pat. No. 6,050,098] and [Kappler et al. U.S. Pat. No. 6,064,677] have been used in client-server systems. However, these concepts have not been extended into IP multicast or conventional routers.

The advantages of putting application-specific information actually into the routing system are many. Backbone routers provide the highest level of access to the Internet. Thus, routing data from lower echelon networks (and client-point-to-router connections) into an upper echelon router, which in turn, determines routing quality of service based on the needs of the federation (i.e. the needs based on source and destination state data which is available to the router because of the record of past packet traffic through it), can substantially reduce overall traffic over the backbone. Since network traffic is directly translatable to cost and performance, utilizing application (game) specific data routing performance and packet traffic reduction rules reduces cost and while improving multiplay game play performance. Culling rules inserted into the router is a specific instance of the concept of inserting portable applications or applets into the route. This is analogous to adding special purposed functionality to a general purpose web by adding applets (which might be downloaded into it).

SUMMARY OF THE INVENTION

This invention broadly resides in a network computing environment and method that facilitates many-to-many data streaming with substantial message culling as well as more standard network optimization such as conventional multicast and Internet host packet routing. The approach allows a very large (i.e., greater than 100,000) number of client applications to communicate logically through a multicast cloud over a common carrier such as the Internet to implement massive groupware configurations including distributed simulations, games, and client selectable/controllable data services used to broadcast audio, video, or other digital data.

According to a preferred embodiment, the technology utilizes three primary components; namely: client software, lobby management, and specialized routing functions. The client software, preferably through an applications programming interface, or API, connects a game client to a lobby manager or broker to initiate entry or joining of a federation (or a game cloud made up of all active players). The lobby manager or brokering software accepts initial client connection, provides a means for validating the client's simulation software (i.e. checks databases and code bases for compatibility with the federation) and provides a means for downloading data to correct deficiencies.

One or more routing systems accept attachments by clients upon direction of one or several lobby managers. The routing systems are able to apply game-specific packet culling rules to and from clients based on programmed logic supplied by qualified programming stations (central router control stations, game lobby managers and/or clients depending on security considerations). Thus, a router can exhibit application stream-specific behaviors in addition to normal packet routing behaviors.

The technology in the preferred embodiment is designed to implement massive distributed games and simulations, however, the technology is equally valuable in implementing other massive Internet applications which benefit from special purpose applets which can be downloaded and executed within the router triggered as part of router message flow control. An example is the distribution of user customizable video, audio, or other digitized information (like medical data).

DETAILED DESCRIPTION OF THE INVENTION

Figure 1:
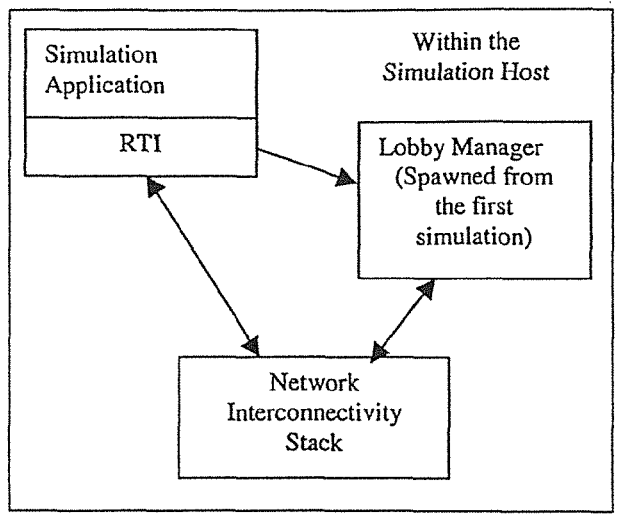
FIG. 1 shows the structure of the RTI implemented per the DMSO specification.

This invention broadly resides in a network computing environment and method that facilitates many-to-many data streaming with substantial message culling as well as more standard network optimization such as conventional multicast and Internet host packet routing through insertion of message traffic or application-specific applets into the message routing system (or into routers). The approach allows a very large (i.e., greater than 100,000) number of client applications to communicate logically through a multicast cloud over a common carrier such as the Internet to implement massive groupware configurations including distributed simulations, games, and client selectable/controllable data services used to broadcast audio, video, or other digital data.

Key innovations of the method include the following:

1) To insert a repeater router (or server cluster) into the Internet backbone to eliminate client packet output replication in favor of sending output packets to the repeater router, which in turn, replicates the packets to the relevant clients. This function with no packet culling is equivalent to multicast implemented by Internet routers that support multicast, but in networks without multicast routers, this function can be implemented by plug-in server which accepts packets and replicates each pack from a particular input client (i.e. IP address) to a list of output clients (i.e. output IP addresses). The address list for each input client is established through a connection protocol that allows the client or a third-party brokering server to associate an output IP address list with each input IP address.

2) To insert rules (or message flow triggered applets) into the repeater router which can decode input packet data and use this information to control replication (i.e. applications-specific programming code which implements packet routing service quality, routing, and culling). Examples of such culling rules include the following: (a) Each client can continuously predict where an object simulated by another client will be absent of control input. If the error between prediction and actual is small enough, the repeater router need not forward any state change packets from source client to destination client. (b) If the destination client has a viewing port then no data from source clients which are outside of the destination client view port need be forwarded. (c) If the destination client is beyond a certain range from the source client no data need be forwarded from out-of-range source clients need be forwarded.

3) To provide a brokering server (or server cluster) which can provide to the repeater router address lists which connect each source client to its destination clients and provide the applets (in the specific case, the packet decoding and culling rules) to the repeater router which allow the repeater router to only forward packets needed based on destination client visibility requirements. Culling rules or code can be provided by any qualified host, client, broker, or a designated network control host.

The communications system for implementing distributed simulation specifically, and other applications where the routing element includes applications data stream dependent information in its routing decisions, is based on extending the concepts defined by the High Level Architecture" (HLA) defined in Defense Modeling and Simulation Office, High Level Architecture Rules Version 1.0, US Dept. of Defense, August 1996. HLA in its defined form is a general purpose architecture for simulation reuse and interoperability. It consists of three parts: (1) HLA Rules, (2) HLA Interface Specification, and (3) Object Model Template Specification. HLA in a client applications is implement through the applications programming interface embodied by the Run Time Infrastructure or RTI.

HLA rules define HLA, its components, and the responsibilities of federates and federations. The official document can be found at http://hla.dmso.mil/tech/rules.html. The HLA Interface Specification is a language independent specification for the HLA functional interfaces between federates and the runtime infrastructure (RTI). The official document can be found at http://hla.dmso.mil/tech/ifspec.html. A simulation client, or one of many simulations which are joined in their execution, is called a federate. A group of these clients together is called a federation. HLA defined interoperability of federates (i.e. how a federation works), and allows for multiple execution of simultaneous federations.

To support its general goals, the HLA requires that federations and individual federates be described by an object model which identifies the data exchanged at runtime in order to achieve federation objectives. This is called the Object Model Template Specification (OMT). The HLA OMT provides a template for documenting HLA-relevant information about classes of simulation or federation objects and their attributes and interactions. This common template facilitates understanding and comparisons of different simulations and federations, and provides the format for a contract between members of a federation on the types of objects and interactions that will be supported across its multiple interoperating simulations. The official document on OMT can be found at http://hla.dmso.mil/tech/omtspec.html.

The implementation of The RTI or Run-Time Infrastructure software provides a set of services which are used by federates to coordinate their operations and data exchange during a runtime execution. The first RTI enable client also serves as a federation broker to help new federates join the federation (or leave it). The RTIs within the federation share federate contact data so the federation will persist as long as any single federate stays connect into it.

Figure 2:
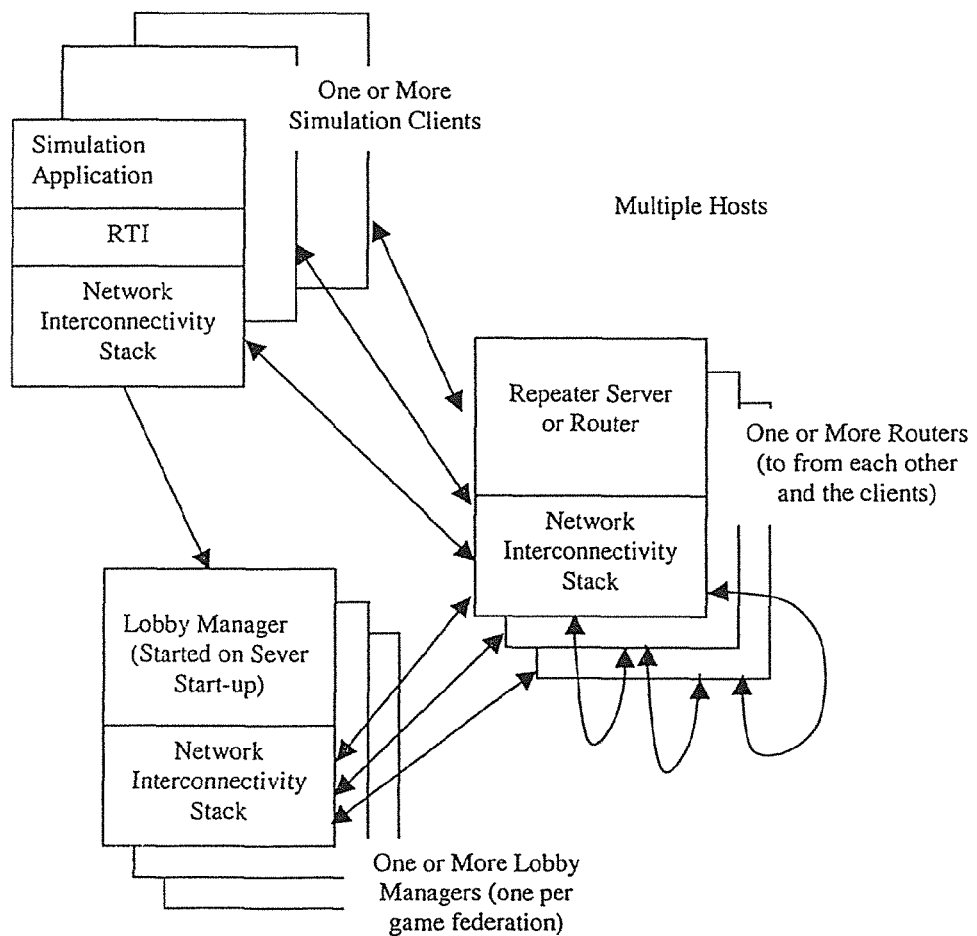
FIG. 2 shows the invention's use of a separated routing function and a lobby manager function.

Like DMSO's HLA specification, this invention includes an RTI, or run time interface, to the client simulation application. In small local area simulations, our RTI can operate just as the DMSO version does (i.e. no centralized or specialized communications processes—just a community of federates endowed with a common RTI). However, when federations which span the Internet are contemplated, two additional functions are present. FIG. 1 shows the structure of the RTI implemented per the DMSO specification. FIG. 2 shows an implementation which contains a separated routing function and a lobby manager function.

The lobby manager function or broker takes charge of joining and exiting federations. The routing function which accepts all communications to and from a federate with its federation. The routers are aware of all connected federates within a federation and can be replicated and placed at convenient points within the Internet backbone (typically within data centers). Since each router services or concentrates communication to and from a maximum number of federates, the routers also know how to package and route data to and from each other simulating the total multicast connectivity assumed in the original DMSO implementation of HLA. In addition, since each router sees the data streams to and from all of its assigned federates, it can operate quality of service rules which control routing performance based on application-dependent rules. This substantially reduces backbone (between routers) and federate connection (from router to federate or simulation client) bandwidth.

The preferred RTI (the "Cybernet RTI") can be used under with any simulation operating system including Microsoft Windows 9x, Windows NT, and Windows 2000. The RTI is implemented by two distinct code modules: the HLA-RTI.DLL (in Windows systems a file with suffix DLL is a code library) and LobbyManager.exe (in Windows a file with suffix .exe is an executable program or process—in this case it implements the lobby manager function).

LobbyManager.exe is a command line application. It maintains a list of running federations. Applications can call LobbyManager.exe by remote procedure calls (RPC calls to get information such as a complete list of running federations, the host machine for each federation, etc. Alternative implementation of remote messaging and request for procedure execution, perhaps through direct socket connections from called process to LobbyManager process will be possible and acceptable. HLA-RTI.DLL is linked into the client application or federate at build or run time.

When hosting a federation (typically within a local network-type setting), it can maintain a list of federates in the federation, or (typically in the Internet setting) can let a FederationHost process spawned by LobbyManager to maintain this list. The host (either HLA RTI.DLL itself or the FederationHost process) reads and parses the FED file to initialize a list of message object classes as well as to define a list of interaction classes. Subsequently the HLA RTI.DLL or FederationHost process maintains these lists for the federation and keeps track of published and subscribed object and interactions of each federate. When reliable data transmission is required, the HLA RTI.DLL or FederationHost process distributes data to each federate. One or the other (implementing the lobby manager function) also acts as a client federate for the local computer that is doing the hosting. When acting as a client federate, the lobby manager function connects to the federation host, and provides all RTI interface API's to the application.

The FED file in this implementation is labeled with a suffix of ".FED". This file is compatible with the DMSO FED file format so it can be created and edited with "Object Model Development Tool (OMDT)" from Aegis Research or simply as an ASCII file with any text editor. An example of what goes in this file to define objects and interaction classes is "HelloWorld.fed" from DMSO available from http://hla.dmso.mil. The following values (stored in the registry in a Windows system) can be modified to customize the installation into a federate by functions provided in the HLA DLL Library (i.e. from in the Software Development Kit or SDK). The implementer of a client application might provide the means for a game user to modify these parameters (for instance by including a dialog box in the application to allow end user to modify parameters). These represent typical parameters an implementer might change:

1. Address. IP address for the machine on which the LobbyManager runs. For example, 192.168.0.2
2. Port. Port that LobbyManager uses. The default is "2000". It is a string value.
3. Address. Multicast IP address. The default is 224.9.9.1.
4. Port. Multicast port base value. The default is 22500. It is a DWORD value. This base address is used by LobbyManager to acknowledge its own existence. Each federation receives a multicast port address from the LobbyManager, which is larger than the base value and smaller than or equal to the maximum port number.

5. MaxPort. Maximum multicast port number. The default is 23500. When all ports between the base port and this port are used up, no more federations can be created.
6. TTL. Multicast TTL.
7. NICAddress. Network interface card IP address. This can be useful when multiple NICs are in a machine.
8. QueueSizeLimit. Multicast is used for "best effort" communication. Multicast packets are placed in a queue when they arrive. If the queue size has reached this limit, new packets will be abandoned.
9. Address. This is a network interface card IP address that is used when hosting a federation. It can be useful on a multiple NIC machine.
10. Port. This is used for TCP connections while hosting a federation.

The LobbyManager process must be started either as a stand-alone application (which would be typical for Internet play—FIG. 2) or by spawning it from a client application (the first federate on a local network for localized play—FIG. 1). The process reads the LobbyManager start-up values (on a Windows implementation in the LobbyManager section in the registry). Other than setting up these values if they need to be changed from their defaults, client code does not need to do anything more for LobbyManager for local play. Starting the LobbyManager replaces the "rtiexec" or "fedex" commands used in the DMSO implementation.

In the client or federate code, a HLA_13 RTI::CLobbyManager class must be created, making sure that this class is present at startup time as well as shutdown time. At startup time, its "Init" member function is called to initialize it, and at shutdown time, its "DeInit" member function is called to clean up. The prototype of the Init function is BOOL Init(BOOL fsearch, DWORD dwTime, BOOL fUseLocalAddress), where "BOOL fsearch" specifies whether to search for LobbyManager.exe via multicast ping.

If the LobbyManager.exe has already started (as is the case when joining Internet play), it is spawned by the first federate, fsearch should be set to FALSE. "DWORD dwTime" specifies how long to wait for a search to complete if fsearch is TRUE. If "BOOL fljseLocalAddress" is TRUE, it is assumed that LobbyManager.exe is running locally. Otherwise the assumption is that it is running at IP address specified in the registry. "DeInit" does not take any parameters. Functions available after "Init" is called and before "DeInit" is called, are the same as those defined in the standard DMSO RTI (examples are provided by DMSO, such as the "Hello world" sample program).

The Cybernet RTI is an SDK is compiled and linked with C++ applications, for instance, within Windows environments. It includes a setup program that installs the necessary components for a developer. The CybernetRTI example implementation is to be used with Microsoft Visual C++ version 6.0. The code generated with CybernetRTI will run under Microsoft Windows 9x, Windows NT 4.0, and Windows 2000.

The C++ header files that are included into client applications are RTI.hh, RTITypes.hh, LobbyManager.h, and HLA_RTIProfile.h. They are placed in the <Installation Directory>\include. The only difference between RTI.hh, RTITypes.hh and the comparable versions from DMSO is that static functions use "fastcall" declaration specifications. Other include files are that same as those available from the DMSO distribution of HLA.

There is one lib(brary) file that is linked into the client application. This is HLA_RTI.lib. It is placed in <Installation Directory>\lib. Following we use the "HelloWorld" example from DMSO to illustrate how the client application is built. In a client application that uses RTI, the first few things the client includes are declarations for a HLA_RTI::CLobbyManager class, a CFederateAmbassador class (see PROGRAM LISTING 1), and a text string char *szFederateName that uniquely identifies the federate.

The CFederateAmbassador FedAmb class is derived from RTI::FederateAmbassador, and overloads some of the RTI::FederateAmbassador member functions. These overloaded functions are callback functions. When something happens on the network, one of the callback functions will be called. Some of the most useful ones are listed below:

```
void CFederateAmbassador::startRegistrationForObjectClass
( RTI::ObjectClassHandle theObjectClass)
throw (RTI::ObjectClassNotPublished, RTI::FederateInternalError) ;
```

This function is called within a federate when another federate on the network is interested receiving data from objects of this class which the first federate publishes. A federate registers for objects in this class to signal to another federate which publishes in the class that it wishes to see state updates as they publish.

```
void CFederateAmbassador: :stopRegistrationForObjectClass
( RTI::ObjectClassHandle theObjectClass)
throw (RTI::ObjectClassNotPublished, RTI::FederateInternalError) ;
```

This function is called when no client on the network is interested in receiving data from objects in this class which a federate publishes. A federate can unregister objects in this class published by another.

```
VoidCFederateAmbassador::turnInteractionsOn(RTI::
    InteractionClassHandletheInteraction) throw(RTI::
    InteractionClassNotPublished, RTI::FederateInternalError) ;
```

This function is called when a federate on the network is now interested in the interaction another has published. A federate updates interactions in this class that is publishes.

```
VoidCFederateAmbassador::turnInteractionsOff(RTI::
    InteractionClassHandle theInteraction) throw(RTI::
    InteractionClassNotPublished, RTI::FederateInternalError) ;
```

This function is called when no client on the network is interested in the interaction another publishes. A client stops updating interactions in this class that it publishes.

```
void
    CFederateAmbassador::discoverObjectInstance(RTI::ObjectHandle
    theObject, // supplied C1 RTI::ObjectClassHandle
    theObjectClass, // supplied C1
    const char *theObjectName) // supplied C4
throw(RTI::CouldNotDiscover, RTI: :ObjectClassNotKnown,
    RTI::FederateInternalError) ;
```

This function is called when an object of a class to which a client subscribes is registered on the network. The client creates an object locally and stores "theObject."

```
void
    CFederateAmbassador::reflectAttributeValues(RTI::ObjectHandle
    theObject, // supplied C1
```

```
    const RTI::AttributeHandleValuePairSet& theAttributes, //
    supplied C4 const char *theTag) //
    supplied C4
throw(RTI::ObjectNotKnown, RTI::AttributeNotKnown,
    RTI::FederateOwnsAttributes, RTI::InvalidFederationTime,
    RTI::FederateInternalError) ;
```

This function is called when an object which a client had previously discovered is updated. The updated values are in "theAttributes." The object is identified by "theObject," as specified in the previous function.

```
void CFederateAmbassador::reflectAttributeValues(RTI::ObjectHandle
theObject, // supplied C1
    const class RTI::AttributeHandleValuePairSet &theAttributes,
    const class RTI::FedTime &theTime, const char *theTag, struct
    RTI::EventRetractionHandle_s)
throw (RTI: ObjectNotKnown, RTI::AttributeNotKnown,
RTI::FederateOwnsAttributes,
    RTI::FederateInternalError) ;
```

This function is the same as the previous one except it includes a time input.

```
void
CFederateAmbassador::receiveInteraction(RTI::InteractionClassHandle
theInteraction, const class
    RTI::ParameterHandleValuePairSet &theParameters, const char
*theTag)
throw(RTI::InteractionClassNotKnown,
RTI::InteractionParameterNotKnown,
    RTI::InvalidFederationTime, RTI::FederateInternalError) ;
```

This function is called when an interaction which applies for a class to which a client has subscribed is updated on the network. The updated values are in "theParameters."

```
void
CFederateAmbassador::receiveInteraction(RTI::InteractionClassHandle
the Interaction,
    const class RTI::ParameterHandleValuePairSet &theParameters,
    const class RTI::FedTime &theTime, const char * theTag, struct
    RTI: EventRetractionHandle_s theHandle)
throw (RTI::InteractionClassNotKnown,
RTI::InteractionParameterNotKnown,
    RTI::FederateInternalError) ;
```

This function is the same as the previous one except it includes a time input.

```
void CFederateAmbassador::removeObjectInstance(RTI::ObjectHandle
theObject,const char *theTag)
throw (RTI::ObjectNotKnown, RTI::InvalidFederationTime,
RTI::FederateInternalError) ;
```

This function is called when an object that a client previously discovered is removed. The object is identified by "theObject," as specified in "discoverObjectInstance."

```
void CFederateAmbassador::removeObjectInstance(RTI::ObjectHandle
    theObject,const class RTI::FedTime &,const char *theTag, struct
    RTI::EventRetractionHandle_s)
throw(RTI::ObjbectNotKnown, RTI::FederateInternalError) ;
```

This function is the same as the previous one except it includes a time input.

```
void
CFederateAmbassador::provideAttributeValueUpdate(RTI::ObjectHandle
    theObject, const class RTI::AttributeHandleSet &theAttributes)
throw(RTI::ObjectNotKnown,
    RTI::AttributeNotKnown,RTI::AttributeNotOwned,
    RTI::FederateInternalError) ;
```

This function is called when a federate on the network requests that another subscriber update data for an object that has been already registered. The object is identified by "theObject," as specified in "discoverObjectInstance."

```
void
    CFederateAmbassador::turnUpdatesOnForObjectInstance(RTI::Object
    Ha
    ndle theObject,const class RTI::AttributeHandleSet
    &theAttributes)
throw(RTI::ObjectNotKnown,
RTI::AttributeNotOwned,RTI::FederateInternalError) ;
```

This function is called when a client on the network is now interested in data from an object that the sourcing client previously registered. The object is identified by "theObject," as specified in "discoverObjectInstance." The sourcing client application starts updating of this object on the network.

```
void
    CFederateAmbassador::turnUpdatesOffForObjectInstance(RTI::ObjectH
    andle theObject,const class RTI::AttributeHandleSet
    &theAttributes)
throw(RTI::ObjectNotKnown,
RTI::AttributeNotOwned,RTI::FederateInternalError) ;
```

This function is called when no client on the network is interested in an object that sourcing client has previously registered. The object is identified by "theObject," as specified in "discoverObjectInstance." The sourcing client stops updating of this object on the network.

PROGRAM LISTING 2 illustrates how a client publishes and subscribes to a objects and their data usingf "PublishAndSubscribetoObjects."

The CheckExitSignal function's prototype is "BOOL CheckExitSignal(void);". It is a very simple function that may be used in a command line application or it may be simply used as follows
BOOL CheckExitSignal (void) {return (_kbhit ( )==0);}
If it is a GUI application, it may be used as:
BOOL CheckExitSignal (void) {return fExit;}
where BOOL fExit=FALSE initially and is set to TRUE when WM_QUIT is received.

The following are descriptions of key Interface Classes. The HLA_RTI:Cprofile class is declared in HLA_RTIProfile.h. All members in this class are static. All registry section name strings and entry name strings, along with default profile values are declared within it. The following are examples:

```
static UINT MS_FASTCALL GetInt(LPCTSTR lpszSection,
LPCTSTR lpszEntry,
int nDefault) ;
    Example:
    DWORD dwMaxPort =
        HLA_RTI::CProfile::GetInt(HLA_RTI:CProfile::m_szMCastSection
        ,HLA_RTI: CProfile::m_szMCastMaxPortEntry,
        DEFAULT_MAX_MCASTPORT) ;
```

```
static CString MS_FASTCALL GetString(LPCTSTR lpszSection,LPCT-
STR
    lpszEntry,LPCTSTR lpszDefault) ;
    Example:
    CString szLobbyManagerAddress
        =HLA_RTI:CProfile::GetInt(HLA_RTI:CProfile::m_szLobbySectio
        n,HLA_RTI:CProfile:: m_szLobbyAddrEntry, "192.168.0.1") ;
static BOOL MS_FASTCALL WriteInt(LPCTSTR lpszSection, LPCTSTR
lpszEntry, int nValue) ;
    Example:
    HLA_RTI:CProfile::WriteInt(HLA_RTI
    :CProfile::m_szMCastSection,HLA
        _RTI:CProfile::m_szMCastMaxPortEntry, dwMaxport) ;
static BOOL MS_FASTCALL WriteString(LPCTSTR lpszSection,
LPCTSTR
    lpszEntry, LPCTSTR lpszValue) ;
    Example:
    HLA_RTI:CProfile::WriteString(HLA_RTI:CProfile::m_szLobbySection,
        HLA_RTI:CProfile:: m_szLobbyAddrEntry,
        szLobbyManagerAddress) ;
    The HLA_RTI:CLobbyManager class is declared in LobbyManager.h.
void DeInit (void) ;
```

This function is called when exiting RTI code.
BOOL Init (BOOL fSearch, DWORD dwTime, BOOL fUseLocalAddress);

This function is called when initiating RTI code. BOOL fsearch: specifies whether to search for LobbyManager.exe via multicast ping or not. If the caller knows a LobbyManager.exe has already been started, or it is going to start it, the caller can set fsearch to FALSE. DWORD dwTime: is used if fsearch is TRUE to specify how long to wait for a response from the LobbyManager to the search request. BOOL fUseLocalAddress is TRUE, if the caller assumes that LobbyManager.exe is running locally (on the same machine making the call). Otherwise the caller assumes that the LobbyManager is running at an IP address specified as a start-up value (in the registry for Windows).
static BOOL MS_FASTCALL IsLobbyManagerRunning (void);

This function checks to determine if LobbyManager.exe is running.
static void MS_FASTCALL ShutDown (void);

This function will shutdown LobbyManager.exe.

The extensions provided by this invention modify the functionality of the LobbyManager and support multiple routing functions which aggregate traffic to and from clients and forward that traffic to other clients or routers based on application dependent evaluation of the messaging streams (based on culling rules). The changes and extensions to implement this functionality are described in this section.

In DMSO version of the RTI, a list of active federation executions is maintained by an executable called rtiexec. Every federation execution is created and destroyed by rtiexec. In Cybernet's version of RTI, described in the previous section, rtiexec is replaced by LobbyManager. Besides simply replacing rtiexec, LobbyManager also has the following extended features:
    Additional APIs
    Additional Runtime Options
    Mtunnel/FederationHost functionality
LobbyManager can be called directly from an RTI enabled client application or federate by RPC (Remote Procedure Call or other equivalent communication mechanism) to obtain information about the list of active federation executions. The following are member functions of HLA_RTI::CLobbyManager class, which is declared in LobbyManager.h:
static BOOL FedexExist (const char *pExecutioName);

This function can be called to see if a federation named with pExecutionName already exists. It returns TRUE if it exists, and FALSE otherwise.

```
static int FindLobbyMember(const char *pLobbyMemberName,
    _SLobbyMember
    *pLobbyMember) ;
```

This function can be called to retrieve information about a federation named with pLobbyMemberName. It returns TRUE if successful, and FALSE otherwise. The requested information is returned in pLobbyMember. The memory space of pLobbyMember is provided by the caller.
static CString * GetHostID (const char *pszHostName);

This function retrieves the application-specified ID of a host of a federation named with pszHostName. It returns NULL if failed.

```
static BOOL GetHostInfo(const char *pExecutionName, unsigned char
    szAddress [16], unsigned char szPort [8]) ;
```

This function retrieves information needed for making a TCP connection to the host of a federation named with pExecutionName.

```
static CString *GetModelName(const char *pszHostName, const char
    *pszID) ;
```

This function retrieves the application-specified model name of an object with ID specified by pszID in a federation hosted by pszHostName. It returns NULL if failed.

```
static BOOL GetFederateList(const char *pLobbyMemberName,
    CTypedPtrList<CPtrList, CString *> *pStringList) ;
```

This function retrieves the list of federates in a federation hosted by pLobbyMemberName.
static int GetLobbyMemberCount (void);

This function retrieves the number of hosts available.
static int GetLobbyMemberNames (long 1BufferSize, char *pBuffer);

This function retrieves the names of all available hosts. Each name is a string of 32 bytes in length with NULL-termination.
static CString * GetScenarioTitle(const char *pszHostName);

This function retrieves the application specified scenario title of a federation hosted by pszHostName.

```
BOOL JoinGameLobby(const char *pszModelName, const char *pszID,
const
    char *pszScenarioTitle, CFederateList &FederateList) ;
```

This function is called implicitly if not called explicitly before creating a new federation. Calling it directly before creating a new federation gives the application option to store additional information about a federation into the federation list maintained by LobbyManager.
void SetHostListChangeCallbackProc (HostListChangeCallbackProc pProc);

This function allows application to setup a callback function. When there is a change in the list of federations, the application will be notified via the callback function. Additional run-time features which support Internet gaming allow the LobbyManager to be placed on a "broker server" computer to manage larger networks of federations over the Internet. The first feature for such purpose is user authentication. An application can use the "Login" member function of HLA_RTI::CLobbyManager class to login to LobbyManager, and the "Logoff" member function to log off. HLA_RTI::CLobbyManager is declared in LobbyManager.h. Alternatively the user "login" can be accomplished via a game-specific web site which is authenticated as a site when the site (through CGI) logs into the LobbyManager through a secure command line interface.

LobbyManager can keep track of a list of "repeater router" machines. Each "repeater router" machine is running a copy of MTunnel to be discussed later. One task of MTunnel is to launch new processes on designated repeater router machines which are placed in data centers distributed about the Internet (based on backbone and client-to-routing machine load balancing considerations) for LobbyManager.

Figure 3:
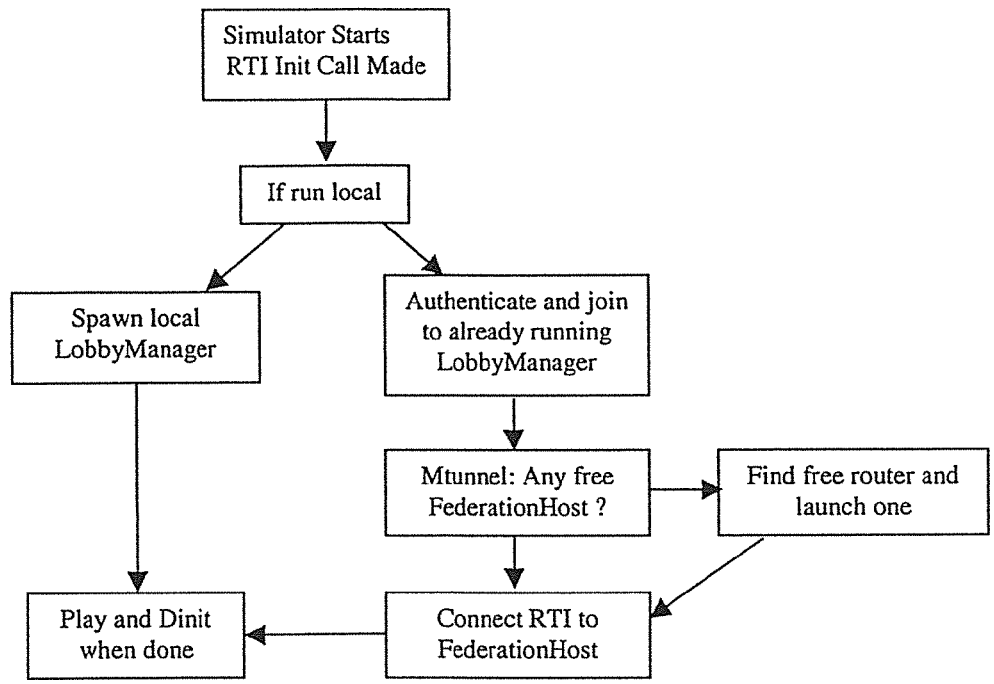
FIG. 3 is a diagram that illustrates how processes for the same federation on various router machines are able to communicate and route client messages from one to another.

If a user requests to create a new federation, or to join an existing federation that already has too many members, a new federation host process will be launched on a repeater routing machine. All FederationHost processes for the same federation on various router machines are able to communicate and route client messages from one to another and each has information about each entire federation within which it operates. FIG. 3 provides a process flow of these operations.

For example, if a client requests LobbyManager to create a federation called "Fed1", LobbyManager makes sure that there is no federation called "Fed1" on its network and then it creates a hosting process for the federation "Fed1" on repeater router 1 which might be called "FederationHost1". When another client requests to join "Fed", it will be assigned to FederationHost1 on repeater router1. As more and more clients join "Fed1," the LobbyManager at some point will decide to create another process called "FederationHost2" on repeater router 2 to host the same federation, namely "Fed1," and will direct newer clients to FederationHost2 as the host. "FederationHost1" and "FederationHost2" share the same client list, the same object list, etc. Each will perform culling functions for the connected clients for which it is responsible.

Figure 4:
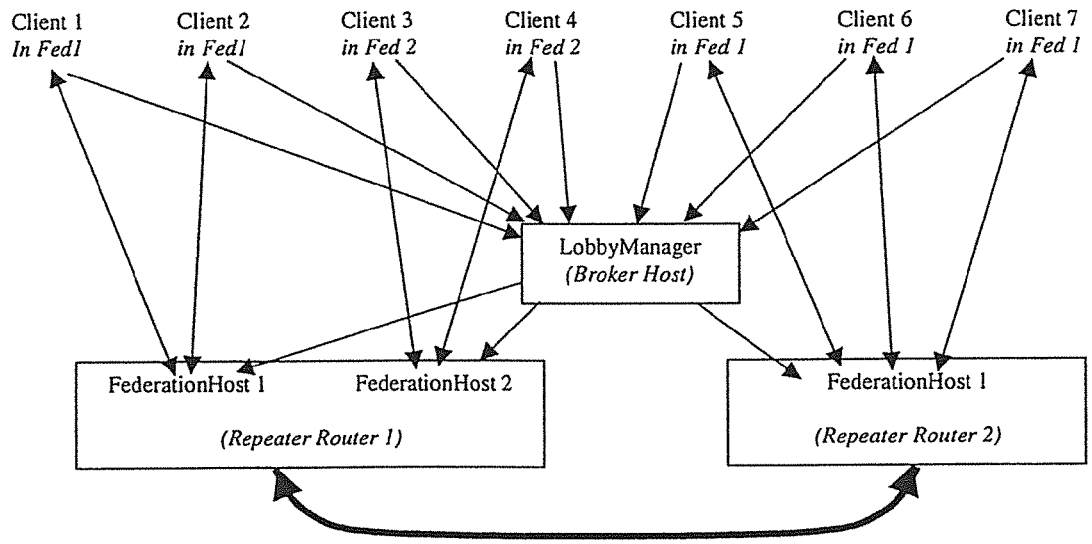
FIG. 4 shows a sample network connecting seven clients to one of two repeater routers through a single LobbyManager.

Suppose that a client requests to create another federation called "Fed2." The LobbyManager makes sure that there is no federation called "Fed2" already defined on its network. Then it find the least busy Mtunnel router, say repeater router and creates a new FederationHost process called FederationHost2 on repeater router1. When another client requests to join "Fed2," it will be assigned to FederationHost2 on repeater router1. Router support for "Fed2" will be grown based on the number of new connections just as it was for "Fed1." FIG. 4 shows a sample network connecting seven (7) clients to one of two repeater routers, through a single LobbyManager. Because FederationHost1 is implemented across the two repeater routers, they must be in communications to route messages from Fed1 clients on one to the other as needed.

When managing a large network of federations over the Internet, LobbyManager will spawn as many FederationHost processes as needed to host a federation.

FederationHost is an executable, but it cannot be run by itself. It is always launched on a free router by LobbyManager through a process named MTunnel.

FederationHost performs all the host functions defined in the RTI code previously described. When there are multiple FederationHosts for a given federation, they communicate with each other via both TCP/IP connections and IP multicast. They will each maintain a complete list of federates, but each will communicate directly with a limited number of these clients.

Exactly which clients will communicate with a given FederationHost is determined by LobbyManager. The client code in HLA_RTI.DLL receives the IP address of an Mtunnel router and a port address of a FederationHost Process from the LobbyManager after it logs in. Then the client code will establish a TCP connection with the FederationHost (for reliable messages) as well as a UDP connection (for lower priority state change messages).

Figure 5:
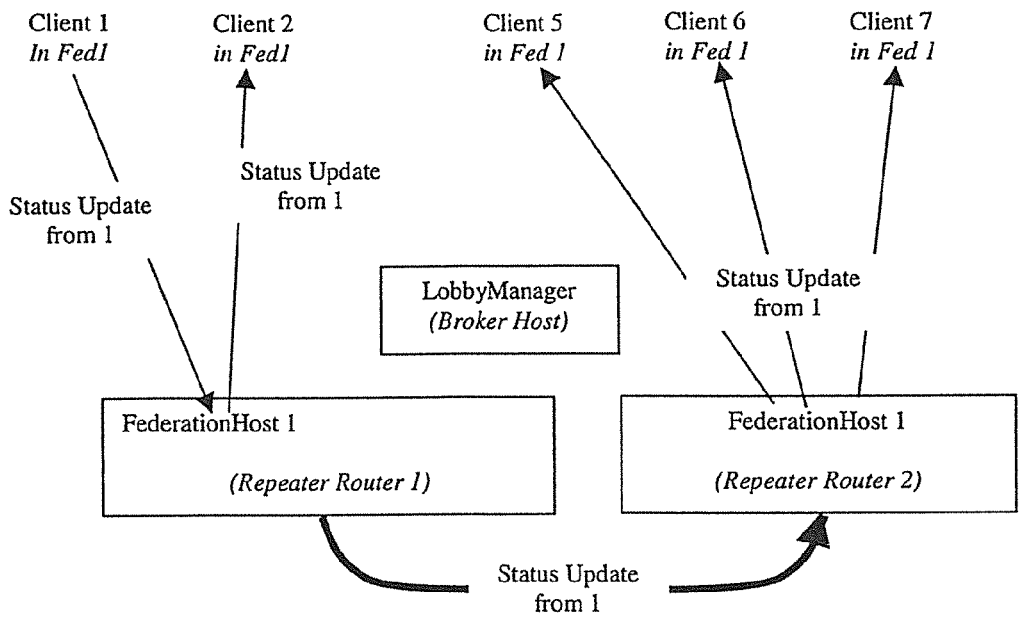
FIG. 5 is a diagram that shows how a status update need not need to be done 10 times for each client connected to repeater router 2 between the repeater routers.

Because clients do not communicate directly with each other, network traffic is greatly reduced. For example, if FederationHost 1 on repeater router 1 is hosting 10 users, and FederationHost 1 on repeater router 2 is hosting 10 users, for the update of the status of a single client connected to repeater router 1, there is going to be one and only one transmission of data from repeater router 1 to repeater router 2. The status update does not need to be done 10 times for each client connected to repeater router 2 between the repeater routers. This is diagramed in FIG. 5.

FederationHost also performs the function of message culling to further reduce network traffic. Culling functions, which are typically application dependent, are defined as "member functions" of various attribute sets in FED files, which reside on repeater routers. These attribute set definitions are provided by the repeater router builder or applications developer in a FOM (Federation. Object Model) library. Each function can be turned on and off at run-time. Certain culling functions can have parameters to be set at run time as well. Because one can derive new attribute sets from existing ones, modeling C++ class derivation with single inheritance, we can create other attribute sets, and are not limited to what has been included in the base FOM library. Some culling functions slow down message service if two clients are far from each other in virtual space (i.e. do not need frequent position updates because position changes over short periods are small relative to mutual distance). Some culling functions exploit the fact that clients project new object positions as a function of last position, velocity, and acceleration. Thus, if an object is both subject to a significant control action, the difference between communicated state messages and the estimated position might be slight enough that the messages need not be forwarded. Other mutual visibility considerations generate culling rules, depending on the application. For instance, sometimes it is useful t divide the game space into zones. Within a localized zone, locations can be coded relative to the zone origin, and visibility might be restricted to only other objects in the same zone. Any and all of these culling functions can be implemented into the member functions in the FOM.

Figure 6:
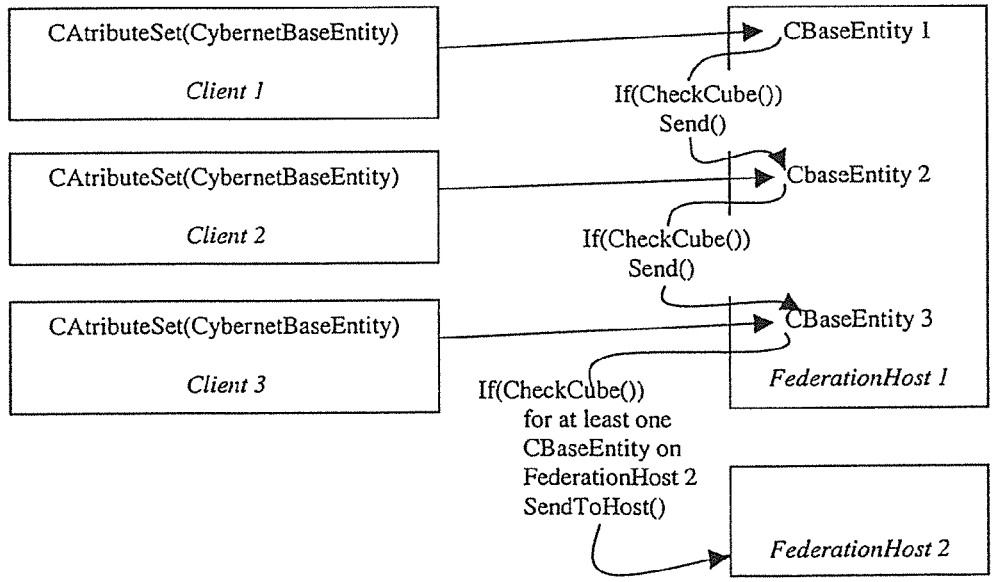
FIG. 6 shows how, if one starts with "CybernetBaseEntity", which consists of double Altitude, double Latitude, and double Longitude, one can define a culling "member function called "CheckCube" for "CybernetBaseEntity"

Referring to FIG. 6, if we start with "CybernetBaseEntity", which consists of double Altitude, double Latitude, and double Longitude, we can define a culling "member function called "CheckCube" for "CybernetBaseEntity", which is defined as "Altitude-Altitude0>=a1 and Altitude-Altitude0<=a2 and Latitude-Latitude0>=b1 and Latitude-Latitude0<=b2 and Longitude-Longitude0>=c1 and Longitude-Longitude0<=c2", where (Altitude0, Latitude0, Longitude0) is a "CybernetBaseEntity" that belongs to the receiving federate. Also a new member function, namely EableCulling, is added to RTI::RTIAmbassador class. It allows applications to turn certain culling rules on and off.

Figure 7:
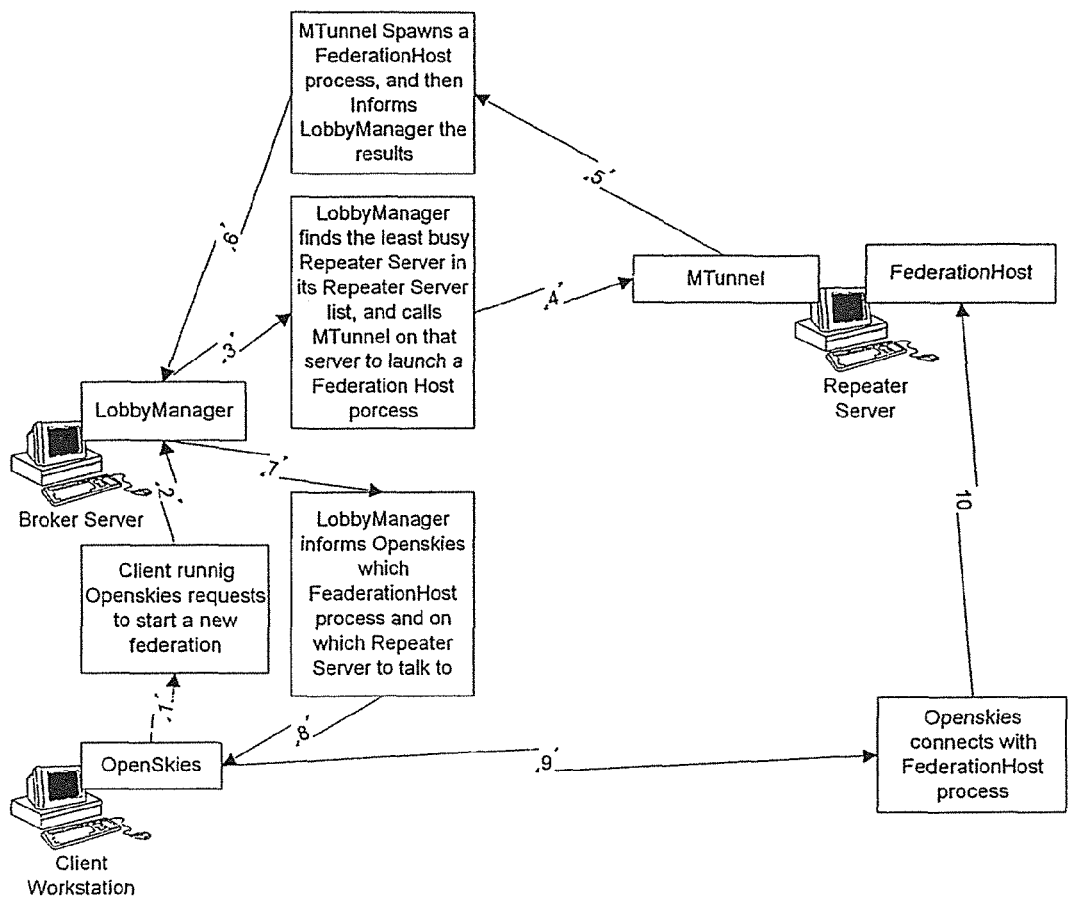
FIG. 7 shows how a new FederationHost process is launched according to the invention.
Figure 8:
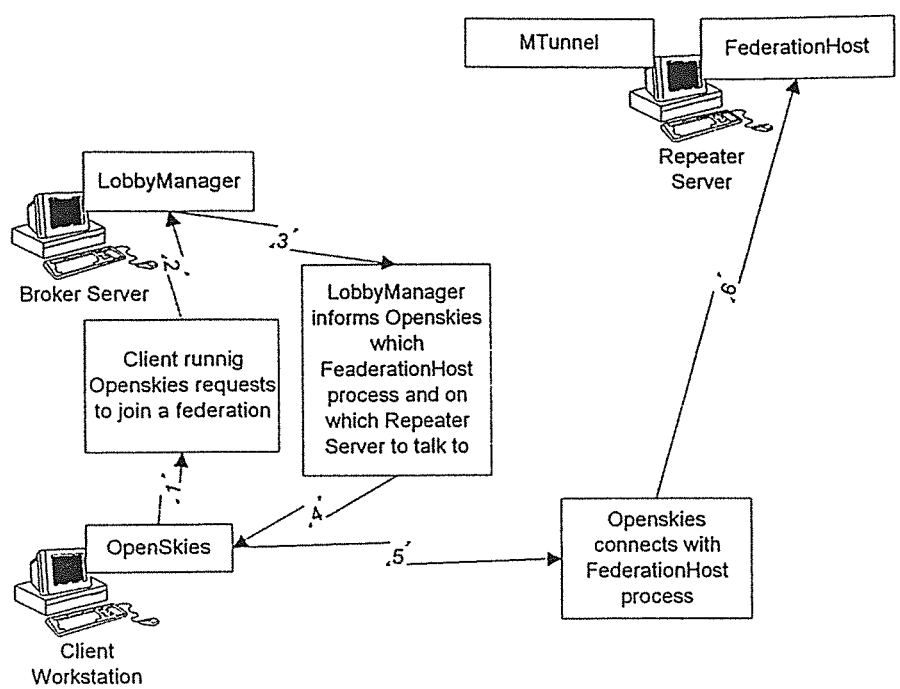
FIG. 8 shows how a federation is joined by a new client assuming that the repeater router is not overloaded.
Figure 9:
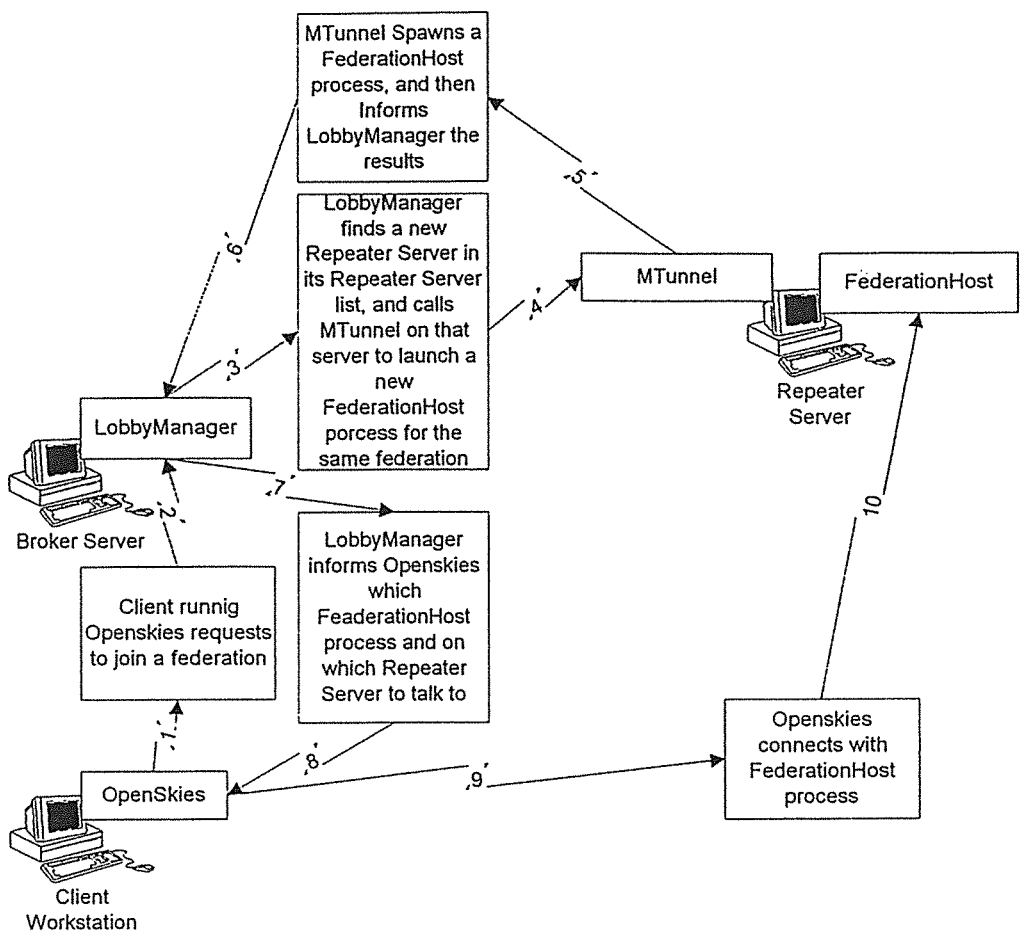
FIG. 9 shows how a federation is joined by a new client assuming that the repeater router is overloaded and must start a new process on a new router.

The MTunnel is an executable process running on a repeater router. Each router has one and only one MTunnel process running. When LobbyManager needs to launch a new FederationHost process on a repeater router, it connects to MTunnel process on that repeater router using TCP/IP, and sends the request. MTunnel will launch the requested new FederationHost process and return the status of the new process to LobbyManager, so that a client application such as a game simulator can connect with the FederationHost process. FIG. 7 shows how a new FederationHost process is launched. FIG. 8 shows how a federation is joined by a new client assuming that the FederationHost router is not overloaded. FIG. 9 shows shows how a federation is joined by a new client assuming that the FederationHost machine (repeater router) is overloaded and must start a new FederationHost process on a new router. The game shown in the figures is OpenSkies, but this game can be replaced with any other.

Figure 10:
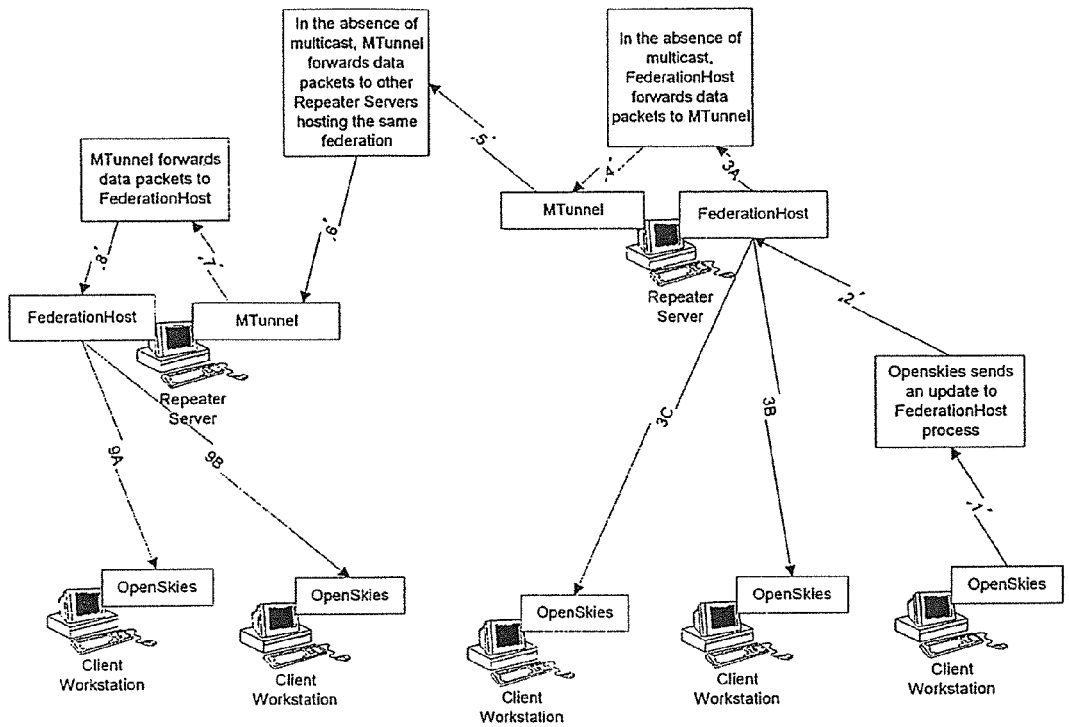
FIG. 10 shows how packets are forwarded to other FederationHosts.

Besides acting as a process launcher, Mtunnel also forwards IP multicast traffic from one repeater router to another using unicast, simulating multicast routing between Mtunnels, when an IP multicast connection is not available between routers. It selects routes of least travel for all forwarded data. FIG. 10 shows how packets are forwarded to other FederationHosts.

Combining FederationHost with Mtunnel processes, we can reduce network traffic through the Internet backbone considerably. If the topology amongst routers is such that a datagram can reach every node with a single pass on every connection segment, the amount of data sent across the Internet is simply proportional to the number of clients. Consider the example of a flight simulator. An aircraft needs to transmit its altitude, latitude, longitude in doubles, heading, pitch, bank in floats, and ID in 32 bit integer for a total of 76 bytes at 30 Hz, i.e., 220 bytes/sec, in UDP datagrams. This number can be further reduced by not sending the high 32 word of each double every frame, for example. So the number becomes 64 bytes at 30 Hz, i.e., 192 bytes/sec. If there are 100 players, the amount of data sent across the Internet backbone is 100*192 bytes/sec=19.2 kilobytes/sec. For 500 users, it is about 96 KB/sec.

Local traffic at each router will still be n-squared times 192 bytes/sec with the absence of culling. However, due to the limited bandwidth that is available to each end user, we further rely on culling to significantly reduce the amount of data sent to each user. Assume that the user is using a 56 kb/sec modem, the number of aircraft it can handle is about 10-15. Since we must leave room for infrequently transmitted data, plus things such as missiles and other projectiles, culling will limit the number of planes to 10. Cybernet FOM library is implemented to support substantial network traffic culling. Therefore, unlike general-purpose attribute set definitions, each variable type is specified. For detailed specifications of general-purpose attribute set definitions in Government defined DMSO FED files, refer to http://hla.dmso.mil/sdc/rti/rting-13v2/refD.pdf. The only deviation in the preferred embodiment described here from the DMSO FED specification is the addition of culling rules and specification of variable types.

The following is a example list of the content of Cybernet FOM library in alphabetical order. Other culling rules in addition to CheckSquare and CheckCube can be defined on an application specific basis within this framework.

1. CBaseEntity2D
    (class CBaseEntity2D
        (attribute x besteffort receive)
        (attribute y besteffort receive)
        (culling CheckSquare double x double y)
    )
2. CBaseEntity. Derived from CBaseEntity2D.
    (class CBaseEntity
        (attribute z besteffort receive)
        (culling CheckCube double x double y double z)
    )

Figure 11:
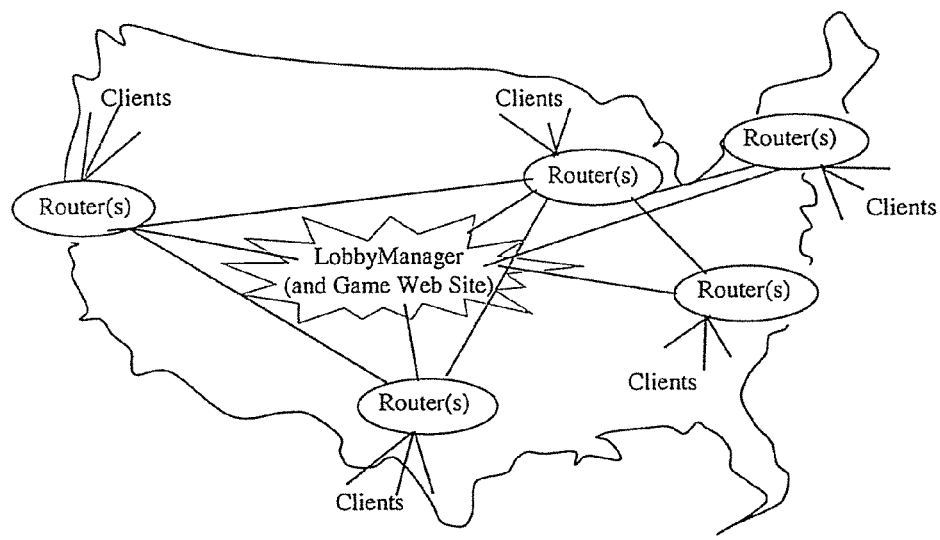
FIG. 11 shows how a routing system according to the invention scales with the total number of connections, which are typically distributed in hardware located across the larger Internet.

A key innovation in the system implemented as the preferred embodiment is that the distributed network of client applications communicate to each other through reapter routing systems. These systems provide a means for connecting/disconnecting from the federation of simulation network (the LobbyManager) and for routing messages from client to client through the mediation of the routers (Mtunnel and FederationHost processes). The LobbyManager scales by simulation network (i.e. application or game and the number of "parallel" game universes or federations defined by the game operator or the players, depending on how the application space is implemented by its developer). The routing system scales with the total number of connections, and as shown in FIG. 11, is typically distributed in hardware located across the larger Internet (or alternatively can be co-located in a single location of network). Spreading of the routing resources optimized transmission bandwidth lower by:
(1) providing points of concentration so that all clients need not connect directly to each other
(2) providing intelligent gateways which can apply culling rules so that messages which would not be relevant to a particular client can be sent a a reduced quality of service or not at all The technology in the preferred embodiment—is designed to implement massive distributed games and simulations, however, the technology is equally valuable in implementing other massive groupware Internet applications with similar characteristics. These characteristics are:
(1) many source clients producing messages or data streams for many destination clients
(2) many messages produced will not be useful at destination client depending on setting or controls which are available to the destination user, but not directly to the source
(3) routing points through which each source client sends and each destination receives and between which a concentrator or routing protocol can be used (to move bulked messages between routers when the source and the destination connect through different ones)
(4) algorithms or culling rules which can eliminate or reduce quality of service to specific message streams to specific destination clients based on the contents of streams from the source and destination clients (since both destination and source clients communicate through the router which implements the rules, both can be consider sources for the purpose of rule execution).

Figure 12:
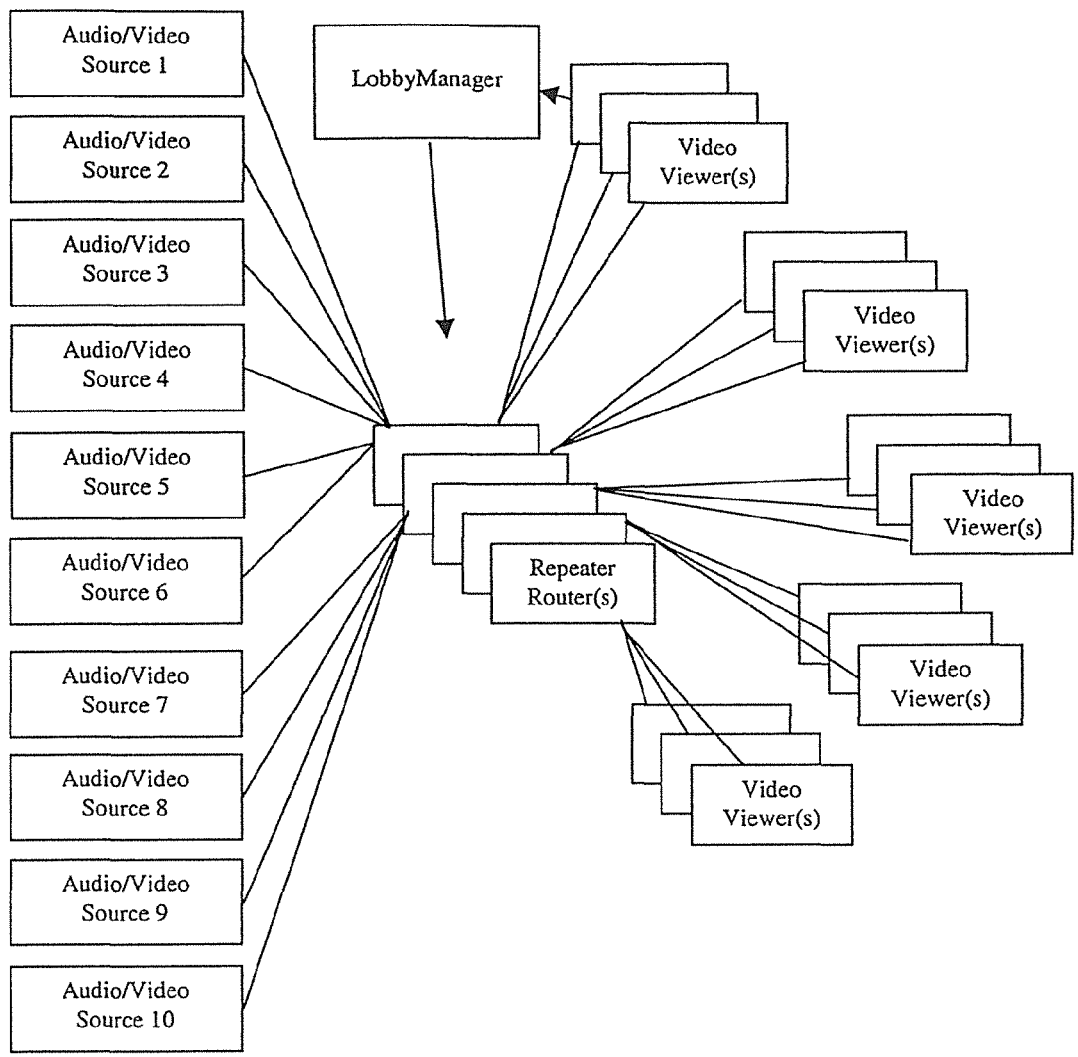
FIG. 12 shows how a user controlled client application might provide controls for selection of different channels from one or many different sources.

Another example of an application which fits this model is distribution of user customizable video, audio, or other digitized information (like medical data). The user controlled client application might provide controls for selection of different channels from one or many different sources (FIG. 12). Only a single feed need be forwarded through the repeater router based on the router's understanding of the controls settings made by the user's player application. For instance, assume ten (10) video capture servers code video streams from ten alternate viewing locations at a sporting event. The user selects at his/her viewing station which stream(s) are relevant to him/her. All streams are sent to a router for distribution (because different users may select views from any of the streams), but because the router knows which views are relevant to which viewers, only some data is forwarded through the router to each user client. This technology might be implemented via conventional multicast routing optimized for fast multicast group joint and unjoin functions, but the preferred embodiment in this disclosure is a preferred application when there are hundreds and perhaps thousands of sources and millions of destinations. In that setting the disclosed approach reduces total aggregate bandwidth orders of magnitude.

I claim:

1. An Internet-based system for implementing massive groupware applications, comprising: a plurality of computer-based clients, each client including a processor and memory with instructions stored in the memory and executed by the processor to implement a groupware application; one or more repeater routers, each repeater router being operative to receive input data packets from at least one of the clients and perform the following functions: decode the input data packets and replicate the packets in accordance with a set of rules, and forward the replicated packets as output data packets to other clients based upon a connection protocol; and one or more lobby managers providing and updating the rules and connection protocol to each repeater router so that each repeater router only forwards packets to relevant clients associated with the groupware application; and wherein the set of rules includes a rule that each client may continuously predict where an object simulated by another client will be absent of control input, and if the error associated with the prediction is sufficiently small, the repeater router need not forward any state change packets from source client to destination client.

2. The system of claim 1, wherein the repeater routers further support conventional packet-routing between clients on a peer-to-peer basis.

3. The system of claim 1, wherein the connection protocol implements a routing address list.

4. The system of claim 1, wherein the rules are applet-based.

5. The system of claim 1, wherein the groupware application is a distributed simulation or game.

6. The system of claim 1, wherein the groupware application is a client selectable and controllable data service associated with the distribution of audio, video, or other digital signal stream.

7. The system of claim 1, wherein the clients enter and leave through a lobby manager.

8. The system of claim 1, wherein the lobby manager is further operative to validate the groupware application in terms of compatibility and download data to correct for deficiencies.

9. The system of claim 1, wherein the repeater routers further implement application-specific message culling to reduce client-cloud communications.

10. The system of claim 9, wherein the message culling includes message omission, rerouting, and other quality-of-service considerations.

11. The system of claim 1, wherein the repeater routers further support one or more conventional multicast protocols.

12. The system of claim 1, wherein each lobby manager is operative to simultaneously process one or more federations for gaming or other applications.

13. The system of claim 12, wherein the federations communicate through multicast or replicated unicast protocols.

* * * * *